United States Patent
Laman

(10) Patent No.: US 10,077,991 B2
(45) Date of Patent: Sep. 18, 2018

(54) OPTICAL ENCODER CONFIGURED TO MITIGATE UNDESIRED INTERFERING LIGHT COMPONENTS

(71) Applicant: Mitutoyo Corporation, Kanagawa-ken (JP)

(72) Inventor: Norman Laman, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 199 days.

(21) Appl. No.: 15/277,413

(22) Filed: Sep. 27, 2016

(65) Prior Publication Data

US 2018/0087931 A1  Mar. 29, 2018

(51) Int. Cl.
*G01D 5/347* (2006.01)
*G02B 27/42* (2006.01)
*G02B 27/46* (2006.01)

(52) U.S. Cl.
CPC ..... *G01D 5/34707* (2013.01); *G01D 5/34715* (2013.01); *G02B 27/425* (2013.01); *G02B 27/4272* (2013.01); *G02B 27/46* (2013.01)

(58) Field of Classification Search
CPC .......... G01D 5/34707; G01D 5/34715; G01D 5/34746; G01D 5/24428; G01D 5/24438; G01D 5/34792; G02B 27/46; G02B 27/425; G02B 27/4272
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,964,727 A | 10/1990 | Huggins | |
| 5,010,655 A | 4/1991 | Rieder et al. | |
| 5,237,391 A | 8/1993 | Huggins | |
| 5,279,044 A | 1/1994 | Bremer | |
| 5,442,166 A | 8/1995 | Hollmann | |
| 5,621,527 A * | 4/1997 | Kaneda ............ | G01D 5/38 250/237 G |
| 5,652,426 A * | 7/1997 | Maeda ............. | G01D 5/38 250/237 G |

(Continued)

*Primary Examiner* — Que T Le
*Assistant Examiner* — Jennifer Bennett
(74) *Attorney, Agent, or Firm* — Seed IP Law Group LLP

(57) ABSTRACT

A device for measuring the relative displacement between two members comprises a scale grating, an illumination source, a detector portion, and an imaging portion. The illumination source outputs diffracted light components (DLC) to the scale grating. The DLC comprises desired interfering light components comprising +1 and −1 order DLC and undesired interfering light components comprising diffraction orders that are not the +1 and −1 order DLC. The detector portion comprises at least a first array of periodically arranged optical detector sensing areas. The illumination source light diffraction grating is positioned proximate to the scale grating and oriented relative to the scale grating such that respective sets of interference fringes formed by different respective sets of interfering light components are differently rotated about the optical axis. The detector portion is oriented such that the optical detector sensing areas are aligned with interference fringes formed by the desired interfering light components.

20 Claims, 6 Drawing Sheets

(56) References Cited

U.S. PATENT DOCUMENTS

| | | |
|---|---|---|
| 5,773,850 A | 6/1998 | Naniwae |
| 5,886,519 A | 3/1999 | Masreliez et al. |
| 5,965,879 A | 10/1999 | Leviton |
| 7,186,969 B2 | 3/2007 | Shimomura et al. |
| 7,307,789 B2 | 12/2007 | Mizutani |
| 7,435,945 B2 | 10/2008 | Shimomura et al. |
| 8,492,703 B2 | 7/2013 | Tobiason et al. |
| 8,941,052 B2 | 1/2015 | Xie et al. |
| 9,018,578 B2 | 4/2015 | Tobiason et al. |
| 9,029,757 B2 | 5/2015 | Tobiason |
| 9,080,899 B2 | 7/2015 | Tobiason |
| 2002/0074487 A1* | 6/2002 | Ito ................... G01D 5/34746 250/231.13 |
| 2008/0062432 A1* | 3/2008 | Sandig ................ G01D 5/38 356/499 |
| 2014/0263987 A1* | 9/2014 | Tobiason ........... G01D 5/34715 250/231.1 |
| 2016/0003605 A1* | 1/2016 | Nakamura ......... G01B 9/02019 356/498 |

\* cited by examiner

OPTICAL ENCODER CONFIGURED TO MITIGATE UNDESIRED INTERFERING LIGHT COMPONENTS

TECHNICAL FIELD

The present application relates generally to precision measurement instruments and more particularly to optical displacement encoders.

BACKGROUND

Various optical displacement encoders are known that use a readhead having an optical arrangement that images a scale pattern to a photodetector arrangement in the readhead. The image of the scale pattern displaces in tandem with the scale member, and the movement or position of the displaced scale pattern image is detected with a photodetector arrangement. Conventional imaging, self-imaging (also called Talbot imaging), and/or shadow imaging may be used to provide the scale pattern image in various configurations.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. In low power consumption applications (e.g., battery powered gauges and the like), it is more desirable to use absolute position scale structures. Absolute position scale structures provide a unique output signal, or combination of signals, at each position along a scale, and therefore allow various power conservation schemes. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655 disclose various encoder configurations and/or signal processing techniques relevant to absolute position encoders, and are hereby incorporated herein by reference in their entirety.

A telecentric optical configuration is utilized in some optical encoders. U.S. Pat. Nos. 7,186,969; 7,307,789; and 7,435,945, each of which is hereby incorporated herein by reference in its entirety, disclose various encoder configurations that utilize either singly or doubly telecentric imaging systems for imaging the periodic pattern of light and sensing displacement of the periodic scale structure. Telecentric imaging systems provide certain desirable features in such optical encoders.

Some encoder configurations realize certain advantages by utilizing an illumination source light diffraction grating in an illumination portion of the encoder configuration. U.S. Pat. Nos. 8,941,052; 9,018,578; 9,029,757; and 9,080,899, each of which is hereby incorporated herein by reference in its entirety, disclose such encoder configurations. Some of the configurations disclosed in these patents may also be characterized as utilizing super resolution moiré imaging. In some of these configurations, an aperture may be incorporated in a telecentric imaging configuration in order to provide spatial filtering that prevents certain unwanted orders of diffracted light from reaching a detector and contributing to associated signal errors or noise. However, further improvements for reducing signal errors or noise due to unwanted residual light reaching a detector remain desirable.

BRIEF SUMMARY

In optical encoders that use known spatial filtering techniques, such as those disclosed in incorporated references, it remains difficult to prevent all unwanted diffracted orders of light (that is, diffracted orders arising from an illumination source light diffraction grating and/or a scale grating) from reaching the detector. For example, for some combinations of scale grating pitches and illumination source light diffraction grating pitches, a spatial filtering aperture may block some unwanted diffraction orders, but other unwanted diffraction orders may give rise to interfering light components that are aligned with the interfering light components arising from desired diffraction orders at the spatial filtering aperture. In such cases, it may be impractical to block such aligned unwanted interfering light components, even though they are detrimental to the accuracy of the optical encoder. Additional techniques are required in order to prevent undesired interfering light components from reaching the detector, or otherwise mitigate their contributions to signal errors or noise.

A device (e.g., an optical encoder) for measuring the relative displacement between two members is disclosed. The device comprises a scale grating, an illumination source, a detector portion, and an imaging portion. The scale grating extends along a measuring axis direction, defines a scale grating plane, and has a scale pitch $P_S$. The illumination source comprises a light source that outputs collimated light having a wavelength $\lambda$, and an illumination source light diffraction grating that inputs the collimated light and outputs diffracted light components (DLC) to the scale grating. The DLC comprise desired interfering light components comprising +1 and −1 order DLC, and undesired interfering light components comprising diffraction orders that are not the +1 and −1 order DLC. The detector portion comprises at least a first array of periodically arranged optical detector sensing areas that have a long axis and a narrow axis, and define a detector plane. The imaging portion is configured to image an illuminated portion of the scale grating plane onto the detector portion. The imaging portion comprises a first lens positioned to receive desired and undesired interfering light components from the scale grating, the first lens having an optical axis and a focal length F that defines a focal point located along the optical axis between the first lens and the detector portion, and an aperture element positioned along the optical axis approximately at the focal length F between the first lens and the detector portion. The source light diffraction grating is positioned proximate to the scale grating and oriented or rotated such that grating lines of the source light diffraction grating are not aligned with the grating lines of the scale grating. The associated rotation of the grating lines of the source light diffraction grating can be defined, for example, as a non-zero first yaw angle $\phi_1$ defined by the angle between the scale grating lines and a projection of the grating line direction of the source light diffraction grating along the optical axis onto the scale grating plane. As a result of the non-zero first yaw angle $\phi_1$, respective sets of interference fringes formed by different respective sets of interfering light components are differently rotated about the optical axis. The detector portion is oriented or rotated such that the optical detector sensing area long axes are aligned with interference fringes formed by the desired interfering light components. The associated rotation of the optical detector sensing area long axes can be defined, for example, as a non-zero second yaw angle $\phi_2$ defined by the angle between the scale grating lines and a projection of the long axis direction onto the scale grating plane along the optical axis. As a result of the configuration outlined above, interference fringes formed by any residual undesired interfering light components will be misaligned with the optical detector sensing area long axes (e.g., a single fringe may cross one or more spatial periods of an array of detector sensing areas in various embodiments). Their resulting signal contributions (e.g., error contributions or noise) for an undesired interference fringe may therefore be detected as a constant signal contribution and/or a common mode error for the various optical detector sensing areas that are crossed by an interference fringe. Such constant signal contributions and/or common mode errors may then be removed or mitigated by appropriate signal combinations and/or signal processing, such that the desired displacement signals are detected with high accuracy.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
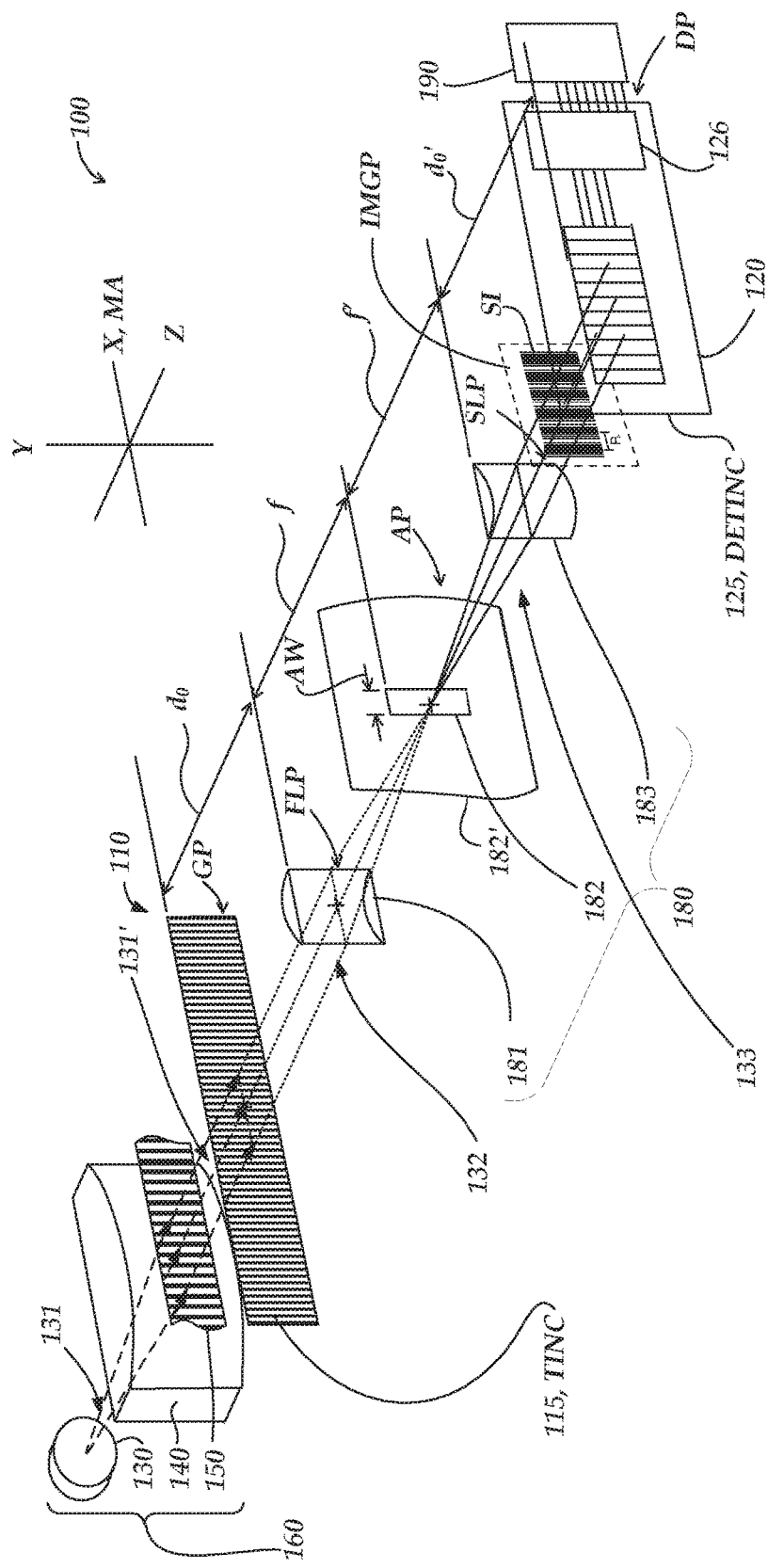
FIG. 1 is a partially schematic exploded diagram of a prior art encoder configuration with an illumination source light diffraction grating, a doubly telecentric arrangement and a scale with an incremental track pattern, utilizing spatial filtering and imaging techniques in a first known configuration.

FIG. 1 is a partially schematic exploded diagram of a prior art encoder configuration 100 with an illumination source light diffraction grating, a doubly telecentric arrangement and a scale with an incremental track pattern, utilizing spatial filtering and imaging techniques in a first known configuration. Certain aspects of the encoder configuration 100 are similar to encoder configurations described in U.S. Pat. No. 9,018,578 (the '578 patent) and U.S. Pat. No. 9,029,757 (the '757 patent).

As shown in FIG. 1, the encoder configuration 100 includes a scale element 110, an illumination system or portion 160, and a doubly telecentric imaging configuration 180. The illumination system or portion 160 includes a light source 130 (e.g., an LED) for emitting visible or invisible wavelengths of light, a lens 140, and an illumination source light diffraction grating 150. The source light diffraction grating 150, or the like, may also be referred to simply as an illumination grating herein, and/or in the present embodiment simply as a phase grating 150. The doubly telecentric imaging configuration 180 comprises a first lens 181 at a first lens plane FLP, an aperture 182 in an aperture component 182' at an aperture plane AP, a second lens 183 at a second lens plane SLP, and detector electronics 120 at a detector plane DP. In at least one implementation, the scale element 110 is separated from the first lens plane FLP by a distance $d_0$, the first lens plane FLP is separated from the aperture plane AP by a focal distance f, the aperture plane AP is separated from the second lens plane SLP by a focal distance f', and the second lens plane SLP is separated from the detector plane DP by a distance $d_0'$. The detector electronics 120 may be connected to signal generating and processing circuitry 190. The light source may also be connected to the signal generating and processing circuitry 190 by power and signal connections (not shown).

In the implementation shown in FIG. 1, the scale element 110 includes a scale pattern 115 that comprises an incremental scale track pattern TINC. It should be understood, that in various implementations, the scale pattern 115 may also include one or more absolute scale track patterns such as those disclosed in the '578 patent.

FIG. 1 shows orthogonal X, Y, and Z directions, according to a convention used herein. The X and Y directions are parallel to the plane of the scale pattern 115, with the X direction parallel to the intended measuring axis direction MA (e.g., perpendicular to elongated pattern elements that may be included in the incremental scale track pattern TINC1). The Z direction is normal to the plane of the scale pattern 115. As will be described in more detail below, the encoder configuration 100 is designed to utilize certain spatial filtering and imaging principles that allow a fine pitch scale to provide larger pitch fringes that correspond to the detector element pitch of an economical detector that senses the scale displacement. In order to produce the desired fringes, the phase grating 150 may be an illumination grating that is designed to have a pitch that is close to the pitch of the incremental scale track pattern TINC (e.g., a phase grating pitch of 5 microns as compared to an incremental scale track pitch of 4 microns). The resulting fringe period arising from the interference of the desired diffracted light components propagated by the phase grating 150 and incremental scale track pattern TINC may be relatively coarse (e.g., 20 microns).

It will be appreciated that there are alternative ways of describing the operation of the encoder configuration 100. According to one type of description, the operation may be described in a way that emphasizes the propagation of certain desired diffracted orders and the blocking of certain other undesired diffracted orders. This type of description generally predominates in this disclosure. However, FIG. 1 is based on the disclosure of the '578 patent, which generally uses a type description that characterizes the operation as comprising an interference pattern which is generated by the illumination grating 150, which is then filtered or modulated by the scale grating 110, to produce a detected pattern. According to this latter type of description, as will be described in more detail below, the detected pattern is imaged with spatial filtering by the double telecentric imaging configuration 180, including the aperture 182 that blurs out or removes the high spatial frequencies corresponding to the incremental scale track patterns TINC. In certain implementations, the parameters are chosen so that the resulting modulated image pitch of the spatially filtered pattern matches the pitch of a predetermined given detector (e.g., a detector designed for a 20-micron incremental scale track pitch). Suitable aperture dimensions may be chosen to achieve the desired effect of the spatial filtering that removes the high spatial frequencies and results in the desired pattern fringe period. Certain teachings regarding such aperture dimensions for achieving desired spatial wavelength filtering are described in more detail in commonly assigned U.S. Pat. No. 7,186,969, which is hereby incorporated by reference in its entirety.

As shown in FIG. 1, the detector electronics 120 includes a detector configuration 125 comprising a detector track DETINC, arranged to receive light from the scale track pattern TINC. The detector electronics 120 may also include signal processing circuitry 126 (e.g., signal offset and/or gain adjustments, signal amplifying and combining circuits, etc.). In at least one implementation, the detector electronics 120 may be fabricated as a single CMOS IC.

In operation, light 131 (e.g., primary light) emitted from the light source 130 may be partially or fully collimated by the lens 140, over a beam area sufficient to illuminate the scale track pattern TINC. The phase grating 150 is sized to diffract the source light to provide diffracted structured light 131' to the scale track pattern TINC. Then, as exemplified by the image channel for the incremental scale track pattern TINC, the scale track pattern TINC provides scale light 132 to the lens 181. It will be appreciated that the limiting aperture 182, which has an aperture width AW along the X-axis direction, acts as a spatial filter to select or limit the light rays that pass through the image channels. FIG. 1 illustrates three such light rays, two extreme rays and one central ray. As shown in FIG. 1, the lens 181 transmits the light rays towards the limiting aperture 182. The limiting aperture 182 transmits the rays as spatially filtered image light 133 to the second lens 183, and the second lens 183 transmits and focuses the spatially filtered image light to form a spatially modulated light pattern at the detector track DETINC. The spatially modulated light pattern at the detector track DETINC may thus be characterized as comprising a modulated and spatially filtered fringe pattern according to one type of description.

In various applications, the detector electronics 120 and light source 130 are mounted in a fixed relationship relative to one another, e.g., in a readhead or gauge housing (not shown), and are guided along the measuring axis MA relative to the scale 110 by a bearing system, according to known techniques. The scale may be attached to a moving stage, or a gauge spindle, or the like, in various applications. It will be appreciated that the configuration shown in FIG. 1 is a transmissive configuration. That is, the scale pattern 115 comprises light-blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective implementations, wherein the light source and the detector electronics are arranged on the same side of the scale 110, and positioned for angled illumination and reflection if necessary, according to known techniques.

Figure 2A:
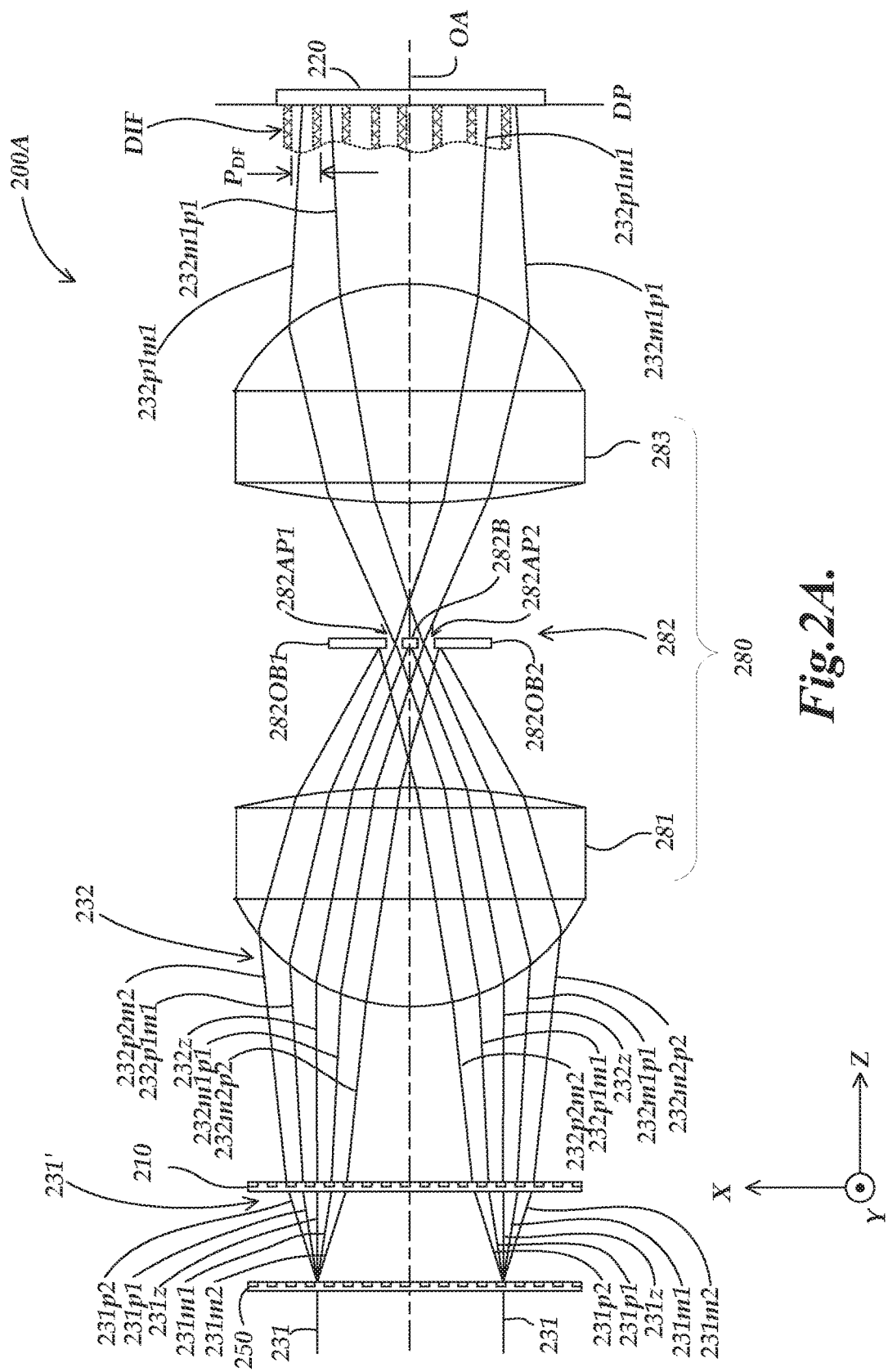
FIG. 2A is a partially schematic diagram of an encoder configuration with an illumination source light diffraction grating, a doubly telecentric arrangement and a scale with an incremental track pattern, utilizing spatial filtering and imaging techniques in a second configuration that includes an enhanced aperture configuration that ideally blocks certain undesired interfering light components to eliminate their potential signal contributions.

FIG. 2A is a partially schematic diagram of an encoder configuration 200A with an illumination source light diffraction grating, a doubly telecentric arrangement and a scale with an incremental track pattern, illustrating a spatial filtering and imaging technique in a second configuration using an enhanced aperture configuration that ideally blocks certain additional undesired interfering light components (in comparison to the configuration 100 shown in FIG. 1) to eliminate their potential signal contributions. The encoder configuration 200 is similar to the encoder configuration 100 of FIG. 1, and may generally be understood by analogy. For example, 2XX series numbers in FIGS. 2A and 2B that have the same "XX" suffix as 1XX series numbers in FIG. 1 may designate similar or identical elements, which may function similarly, except as otherwise described or implied below. The encoder configuration 200 also shares some characteristics with an implementation disclosed in commonly assigned U.S. Pat. No. 8,492,703 (the '703 patent) which is hereby incorporated by reference in its entirety. However, the '703 patent emphasizes different teachings and does not recognize certain problems (or advantages) that may be associated with such an implementation, as outlined herein.

As previously noted, there are alternative ways of describing the operation of an encoder configuration such as the encoder configurations 100 or 200. While the encoder configuration may be understood in terms of the type of description used above for the encoder configuration 100, for the present purposes the operation is alternatively described in a way that emphasizes the propagation of certain desired diffracted orders and the blocking of certain other undesired diffracted orders.

The encoder configuration 200 comprises a scale grating 210, an illumination source 260, a detector portion 220, and an imaging portion 280. The scale grating 210 extends along a measuring axis direction MA and defines a scale grating plane SGP. The scale grating 210 has a scale pitch $P_{SG}$. The illumination source 260 comprises a light source 240 and an illumination source light diffraction grating 250. The light source 240 comprises a point source 241 and a collimating lens 242. The detector portion 220 comprises a first array of periodically arranged optical detector sensing areas DETINC that have a long axis and a narrow axis, and define a detector plane DP. The imaging portion 280 comprises a first lens 281, an aperture portion 282, and a second lens 283.

In the implementation shown in FIG. 2A, the aperture portion 282 comprises an inner blocking portion 282B, open aperture portions 282AP1 and 282AP2, and outer blocking portions 282OB1 and 282OB2. The inner blocking portion 282B and the outer blocking portions 282OB1 and 282OB2 are constructed from an opaque material which blocks a portion of the scale light 232. The open aperture portions 282AP1 and 282AP2 may comprise either a transmissive material or an open portion of the material of the aperture portion 282. The inner blocking portion 282B and the open aperture portions 282AP1 and 282AP2 are centered about the optical axis OA.

FIG. 2A shows several orders of diffracted light components (DLC) 231' output from the illumination source light diffraction grating 250, indicated as exemplary rays from two portions symmetrically located about an optical axis OA. The exemplary rays include 0 order light 231z, +1 order light 231p1, −1 order light 231m1, +2 order light 231p2, and −2 order light 231m2. FIG. 2A further shows several orders of scale light 232 which are formed from corresponding orders of the DLC 231', indicated as two exemplary rays symmetrically located about the optical axis OA. Light 232z corresponds to a 0 order portion of scale light 232 output from 0 order light 231z. Light 232p1m1 corresponds to a −1 order portion of scale light 232 output from +1 order light 231p1. Light 232p2m2 corresponds to a −2 order portion of scale light 232 output from +2 order light 231p2. Light 232m1p1 corresponds to a +1 portion of order scale light 232 output from −1 order light 231m1. Light 232m2p2 corresponds to a +2 order portion of scale light 232 output from −2 order light 231m2.

The light 232p1m1 and the light 232p1m1 may be understood to be desired interfering light components arising from +1 order light 231p1 and the −1 order light 231p2. The open aperture portion 282AP1 is configured to transmit light 232p1m1. The open aperture portion 282AP2 is configured to transmit light 232m1p1.

The inner blocking portion 282B is configured to block light 232z. The outer blocking portion 282OB1 is configured to block light 232p2m2 (as well as higher order portions of scale light 232 not shown). The outer blocking portion 282OB2 is configured to block light 232m2p2 (as well as higher order portions of scale light 232 not shown). The blocked light may be understood to be undesired interfering light components comprising diffraction orders that are not the +1 order light 231p1 and the −1 order light 231p2 (e.g., 0 order, and +2 and −2 order light, etc.).

According to the foregoing description, it will be appreciated that in the encoder configuration 200 the desired interfering light components, comprising +1 and −1 order light from the illumination source light diffraction grating 250, propagate through the aperture 282 as the rays 232p1m1 and 232m1p1, which interfere to create desired interference fringes DIF having a detected fringe pitch $P_{DF}$ on the detector portion 220, while the other illustrated light rays which represent undesired interfering light components are blocked from reaching the detector portion 220. The detected fringe pitch $P_{DF}$ is discussed in further detail below with reference to EQUATION 1. While the illustrated rays represent most of the light energy which might potentially reach the detector portion 220, it should be appreciated that for clarity of illustration only one diffracted order is shown arising at the scale grating 210 for each ray that is input from illumination source light diffraction grating 250. In reality, multiple diffracted orders arise at the scale grating 210 for each ray that is input from illumination source light diffraction grating 250, which can lead to error signal contributions in certain implementations, as described in greater detail below.

Figure 2B:
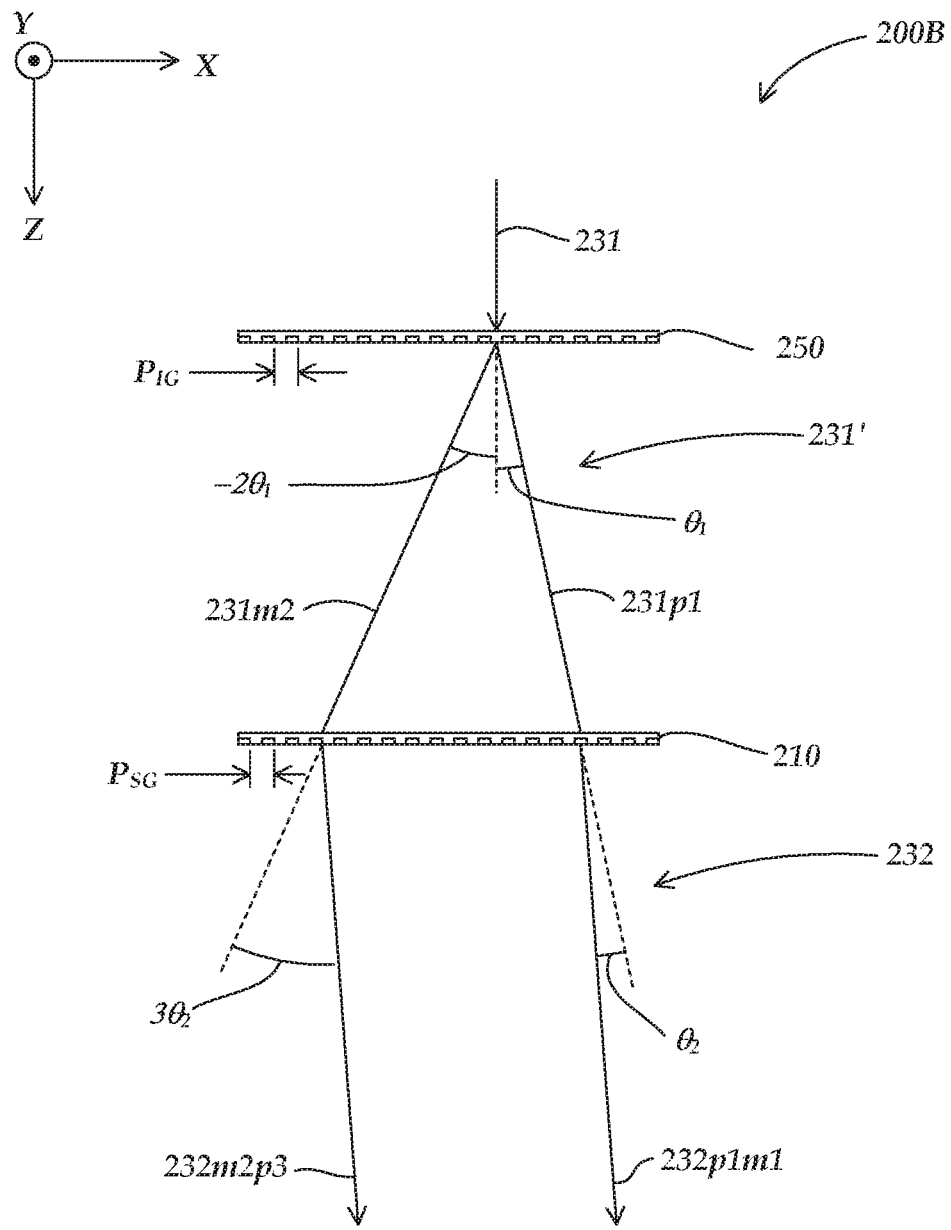
FIG. 2B is a schematic ray diagram illustrating the inability of the prior art encoder configuration of FIG. 2A to block all undesired interfering light components in various implementations.

FIG. 2B is a schematic ray diagram 200B illustrating the inability of the prior art encoder configuration 200A of FIG. 2A to block all undesired interfering light components in certain implementations. In particular, as noted above, multiple diffracted orders arise at the scale grating 210 for each ray that is input from illumination source light diffraction grating 250. FIG. 2B illustrates two rays, the ray 232p1m1 and the ray 232m2p3. It will be understood that each of these rays is representative of a field of similar rays that occur in the operational illumination of an encoder configuration (e.g., the encoder configuration 200).

In FIG. 2B, the illumination source light diffraction grating 250 inputs collimated light 231 and outputs DLC 231' to the scale grating 210. The DLC 231' is shown to include (but is not limited to) +1 order light ray 231p1 and −2 order light ray 232m2 which diffract at angles $-2\theta_1$ and $\theta_1$ with respect to an angle of incidence of the collimated light 231. The scale grating 210 receives the +1 order light ray 231p1 and the resulting diffracted orders in the scale light 232 include the −1 order light ray 232p1m1 at an angle $\theta_2$ with respect to an angle of incidence of the input +1 order light ray 231p1. The scale grating 210 also receives the −2 order light ray 231m2 and the resulting diffracted orders in the scale light 232 include the +3 order light ray 232m2p3 at an angle $3\theta_2$ with respect to an angle of incidence of the input −2 order light ray 232m2.

The ray 232p1m1 was previously illustrated in FIG. 2A, and includes light from the desired interfering light component comprising +1 order light from the illumination source light diffraction grating 250, which propagates through the aperture 282 as the rays 232p1m1 in FIG. 2A.

The ray 232m2p3 comprises a sequential combination of diffracted orders that was not illustrated in FIG. 2A. In particular, the ray 231m2 arising from the illumination source light diffraction grating 250 was shown in FIG. 2A, but the +3 diffraction order arising from that input ray at the scale grating 210, which gives rise to the ray 232m2p3 was not shown in FIG. 2A. As illustrated in the example shown in FIG. 2B, the resulting "undesired" ray 232m2p3 is parallel to the "desired" ray 232p1m1. This may occur for some useful combinations of grating pitches of the illumination source light diffraction grating 250 and scale grating 210. Furthermore, it should be appreciated that in FIG. 2A any parallel rays are focused to the same location at the plane of the aperture 282. Therefore, for the example illustrated in FIG. 2B, because the desired ray 232p1m1 passes through the aperture 282 the parallel "undesired" ray 232m2p3 will also be focused to pass through the aperture 282 and will reach the detector 220.

Regarding a combination of grating pitches which may correspond to FIG. 2B, for the encoder configuration 200 or the like, a combination of a scale grating pitch $P_{SG}$ and an illumination grating pitch $P_{IG}$ generates interference fringes (detected fringes) in the vicinity of the detector 220 that have a fringe pitch $P_{DF}$ according to the relation:

$$P_{DF} = \frac{P_{SG}P_{IG}}{2|P_{SG} - P_{IG}|} \qquad \text{EQ. 1}$$

In some implementations, it is desirable to implement a single detector portion which may be used with multiple scale pitches corresponding to multiple encoder models and/or measuring resolutions, or the like. In various embodiments, such a detector may include periodically arranged optical detector sensing areas that have a detector pitch $P_D$ that is the same as the detected fringes, in order to spatially filter the detected fringes and generate the desired displacement and/or position signals. In one exemplary embodiment, the detector pitch $P_D$ may be 6 micrometers, for example. In such a case, according to the equation above, a combination of a scale grating pitch $P_{SG}$ of 4 micrometers and an illumination grating pitch $P_{IG}$ of 3 micrometers generates interference fringes (detected fringes) in the vicinity of the detector 220 that have a fringe pitch $P_{DF}$ of 6 micrometers.

In various practical embodiments, the detected light represented by the "undesired" ray 232m2p3 may comprise on the order of 1% or less of the energy included in the detected light represented by the desired ray 232p1m1. However, since ray 232m2p3 can mix with the desired ray 232m1p1 to create fringes on the detector 220, the error scales with the geometric mean of their intensities and may cause detectable errors in position measurements of the encoder configuration 200. The errors may arise, for example, because the undesired ray 232*m*2*p*3 includes different diffracted orders than the desired ray 232*p*1*m*1, and has a different optical path length between the gratings, and has a different sensitivity to various potential grating misalignments and gap variations. As a result, the spatial phase and or amplitude of the associated light that reaches the detector 220 may vary relative to the light represented by the desired ray 232*p*1*m*1, which introduces an erroneous signal or noise contribution in the detected light. For this reason, additional techniques are required in order to mitigate position measurement errors resulting from the transmission of undesired interfering light components, as described below.

Figure 3:
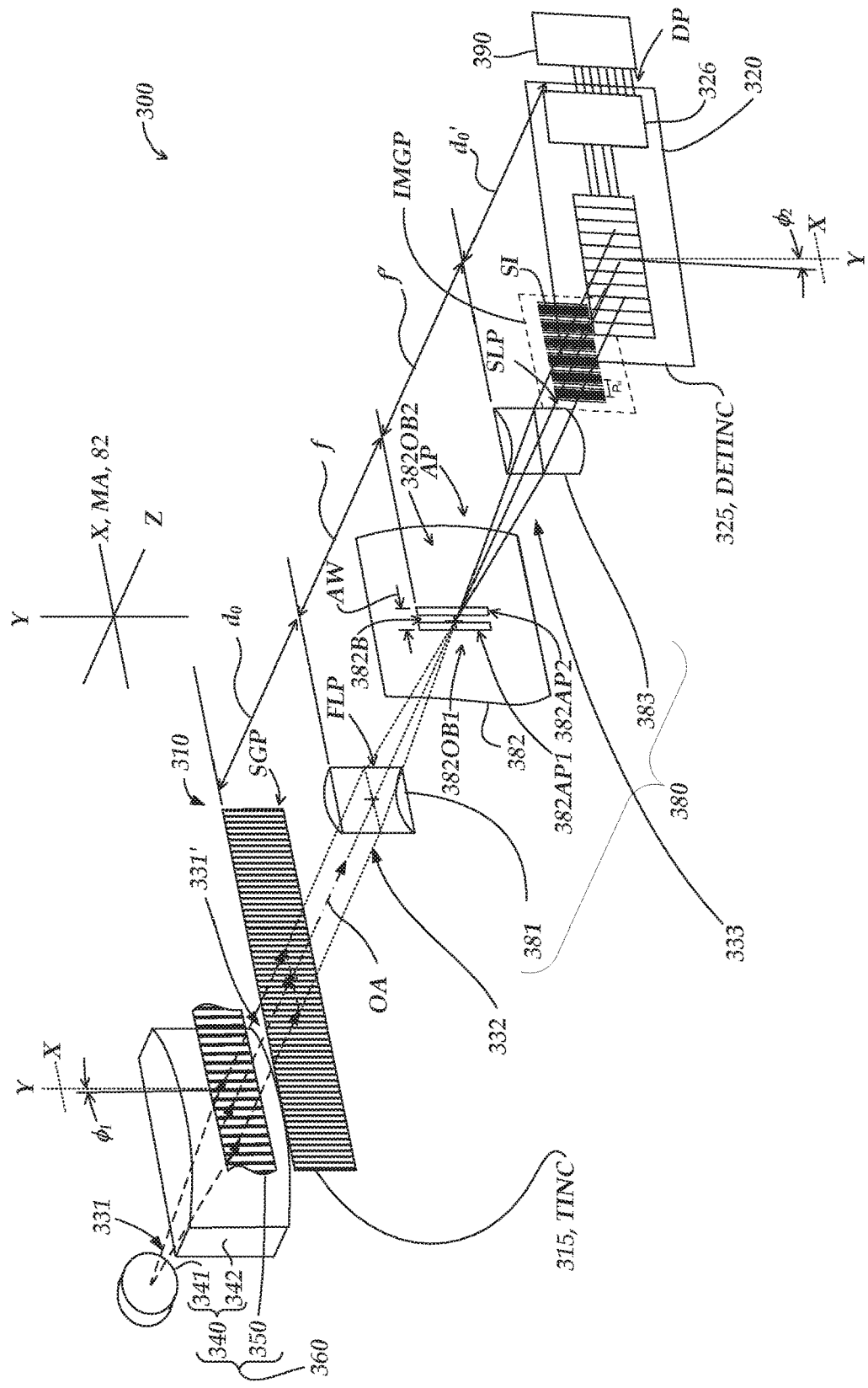
FIG. 3 is a partially schematic exploded diagram of an encoder configuration with an illumination source light diffraction grating, a doubly telecentric arrangement and a scale with an incremental track pattern, wherein the configuration rotates various components in accordance with the principles disclosed herein, to eliminate potential signal contributions from various undesired interfering light components such as those illustrated in FIG. 2B.

FIG. 3 is a partially schematic exploded diagram of an encoder configuration 300 with an illumination source light diffraction grating, a doubly telecentric arrangement and a scale with an incremental track pattern, wherein the configuration rotates various components in accordance with principles disclosed herein, to eliminate potential signal contributions from various undesired interfering light components such as those illustrated in FIG. 2B. The encoder configuration 300 may further utilize spatial filtering and imaging techniques in accordance with the principles described above with reference to FIG. 1 and FIGS. 2A and 2B, as may be understood by analogy to previous description. Some portions of the encoder configuration 300 are similar to portions of the encoder configuration 100 of FIG. 1, and may generally be understood by analogy. For example, 3XX series numbers in FIG. 3 that have the same "XX" suffix as 1XX series numbers in FIG. 1 may designate similar or identical elements, which may function similarly, except as otherwise described or implied below.

Similarly to FIG. 1, FIG. 3 shows orthogonal X, Y, and Z directions, according to the convention used herein. The X and Y directions are parallel to a scale grating plane SGP of the scale grating 310, with the X direction parallel to the intended measuring axis direction MA, and the Y direction parallel to the long axis of the grating elements of the scale grating 310. The Z direction is normal to the X-Y plane, and in this particular embodiment is parallel to the optical axis OA.

The encoder configuration 300 comprises the scale grating 310, an illumination source 360, a detector portion 320, and an imaging portion 380. The illumination source 360 comprises a light source 340 and an illumination source light diffraction grating 350. The light source 340 comprises a point source 341 and a collimating lens 342. The detector portion 320 comprises a first array of periodically arranged optical detector sensing areas DETINC that have a long axis and a narrow axis, and define a detector plane DP. The imaging portion 380 comprises a first lens 381, an aperture element 382, and a second lens 383.

In operation, the point source 341 outputs light 331 to the collimating lens 342 which outputs collimated light 331' having a wavelength λ. The illumination source light diffraction grating 350 inputs the collimated light 331 and outputs diffracted light components (DLC) 331' to the scale grating. The DLC 331' comprise: desired interfering light components comprising +1 and −1 order DLC and undesired interfering light components comprising diffraction orders that are not the +1 and −1 order DLC. The imaging portion is configured to image an illuminated portion of the scale grating plane SGP onto the detector portion 320. More specifically, the first lens 381 is positioned to receive desired and undesired interfering light components from the scale grating 310. The first lens 381 has an optical axis and a focal length F that defines a focal point located along the optical axis between the first lens 381 and the detector portion 320.

The aperture element 382 is positioned along the optical axis approximately at the focal length F between the first lens 381 and the detector portion 320. It should be appreciated that similar encoder configurations using a scale grating on a curved surface may be constructed according to the principles of the encoder configuration 300. In implementations in which the scale grating is on a curved surface (e.g., a cylindrical encoder), the scale grating plane SGP should be interpreted at each location on the grating as a plane tangent to the grating surface at that point.

The aperture portion 382 comprises an inner blocking portion 382B, open aperture portions 382AP1 and 382AP2, and outer blocking portions 3820B1 and 3820B2. The inner blocking portion 382B and the outer blocking portions 3820B1 and 3820B2 are constructed from an opaque material which blocks a portion of the scale light 332. More specifically, the inner blocking portion 382B is configured to block a 0 order portion of the scale light 332, and the outer blocking portions 3820B1 and 3820B2 are configured to block higher order portions of the scale light 332, while the open aperture portions 382AP1 and 382AP2 transmit the desired interfering light components. The open aperture portions 382AP1 and 382AP2 may comprise either a transmissive material or an open portion of the material of the aperture portion 382. The inner blocking portion 382B and the open aperture portions 382AP1 and 382AP2 are centered about the optical axis OA.

In the implementation shown in FIG. 3, the illumination source light diffraction grating 350 is positioned proximate to the scale grating 310 and oriented relative to the scale grating 310 such that grating lines of the illumination source light diffraction grating 350 are rotated by a non-zero first yaw angle $\phi_1$ relative to grating lines of the scale grating 310, when projected onto the scale grating plane SGP along a direction normal the scale grating plane SGP. As a result of this grating rotation, respective sets of interference fringes formed by different respective sets (that is, different diffractive orders) of interfering light components are differently rotated about the optical axis. As described in more detail below with reference to FIG. 4, the detector portion 320 is then oriented such that the optical detector sensing area long axes are aligned with interference fringes formed by the desired interfering light components (e.g., the interfering light components represented by the rays 232*p*1*m*1 and 232*m*1*p*1 in FIG. 2A), whereby the optical detector sensing area long axes are rotated by a non-zero second yaw angle $\phi_2$ relative to grating lines of the scale grating when projected onto the scale grating plane SGP along the optical axis.

In various embodiments, for the fringes resulting from the desired interfering light components outlined above, the second yaw angle $\phi_2$ (the yaw angle of the desired fringes at the detector portion 420) and the first yaw angle $\phi_1$ may be related according to the relation:

$$\phi_2 = (P_{SG}/2 \cdot P_{DF}) \cdot \phi_1 \qquad \text{EQ. 2}$$

Thus, for one previously outlined example where $P_{SG}=4$ microns and $P_{DF}=6$ microns, $\phi_2=3\phi_1$ according to EQUATION 2.

For the fringes resulting from the undesired interfering light components outlined above mixing with the desired interfering light components, the yaw angle $\phi_{UF}$ (the yaw angle of the undesired fringes at the detector portion 420) and the first yaw angle $\phi_1$ may be related according to the relation:

$$\phi_{UF} = -3\phi_1 \qquad \text{EQ. 3}$$

Therefore, in the exemplary case where $\phi_2=3\phi_1$, the fringes resulting from the undesired interfering light components may be rotated by an angle of $6\phi_1$ relative to the long axes of the individual detector areas. That is, in an exemplary encoder configuration with a scale grating pitch $P_{SG}$ of 4 microns, and an illumination grating pitch $P_{IG}$ of 3 microns, a detector pitch $P_D$ may be 6 microns (to match a 6-micron detected fringe pitch $P_{DF}$) and the first yaw angle $\phi_1$ may be approximately 0.0017 radians (0.1 degrees) and the second yaw angle $\phi_2$ may be approximately 0.0051 radians (0.3 degrees). It will be understood that the foregoing embodiment is exemplary only, and not limiting. More generally, the primary principle that applies the embodiments disclosed and claimed herein is the illumination source grating elements are rotated by a small desired amount relative to the scale grating elements. Interference fringes arising from various combinations of diffractive orders, if they appear at the detector portion will then be differently rotated (e.g., about the optical axis). The detector elements may then be oriented (e.g., rotated about the optical axis in a plane of the detector elements) such that the detector elements are aligned with the desired fringes that provide the desired displacement signal, and misaligned with any undesired fringes that reach the detector portion. Rather than following a strict formula, for any given illumination grating rotation relative to the scale grating, the detector elements may be rotated based on analysis or experiment, and may furthermore be adjusted by observation and/or analysis of various signals from the detector portion (e.g., a lissajous pattern from quadrature signals) to provide the most desirable and error-free signal as the scale is displaced relative to the encoder readhead.

In some implementations, the illumination source 360, the detector portion 320 and the imaging portion 380 may be arranged in a fixed relationship to one another in a readhead. In some implementations, the illumination source light diffraction grating 350 may be arranged parallel to the scale grating plane SGP.

In some implementations, the detector portion 320 may be positioned a distance Z (equal to $d_0$ in FIG. 3) from the imaging portion 380 along the optical axis. The first array of periodically arranged optical detector sensing areas may have a detector pitch $P_D$ that matches a fringe pitch $P_{DF}$ of the detected interference fringes formed by the desired interfering light components, and may be arranged at a first spatial phase position. The aperture portion 382 may be configured with a dimension AW along the measuring axis direction (i.e., the outer periphery of the open aperture portions 382AP1 and 382AP2) such that $AW=Z*\lambda*(2*a/(P_{MI}P_{SG}/((P_{IG}-P_{SG}*M)))$, where M is a magnification value of the imaging portion, and the value of a is greater than 0.5 and less than 4.0.

In some embodiments, the scale pitch $P_{SG}$ and the illumination grating pitch $P_{IG}$ may be selected to cooperate with the detector pitch $P_D$ such that $P_{MI}P_{SG}/(P_{IG}-P_{SG})=P_{DF}=m*P_D/k$ when the light source outputs incoherent light, and $P_{MI}P_{SG}/(2*P_{IG}-P_{SG})=P_{DF}=m*P_D/k$ when the light source outputs coherent light, wherein m is a number of phase signals output by the detector portion 320 and k is an odd integer, and wherein the spatial wavelength $P_{DF}$ is larger than the scale pitch $P_{SG}$.

The imaging portion 380 comprises a doubly telecentric arrangement. However, such optical arrangement is exemplary only, and not limiting. In alternative implementations, a singly telecentric arrangement may be used in accordance with the principles disclosed herein. In such an implementation, the second lens 383 may be omitted. An exemplary singly telecentric imaging portion may be understood by reference to the '578 patent.

Figure 4:
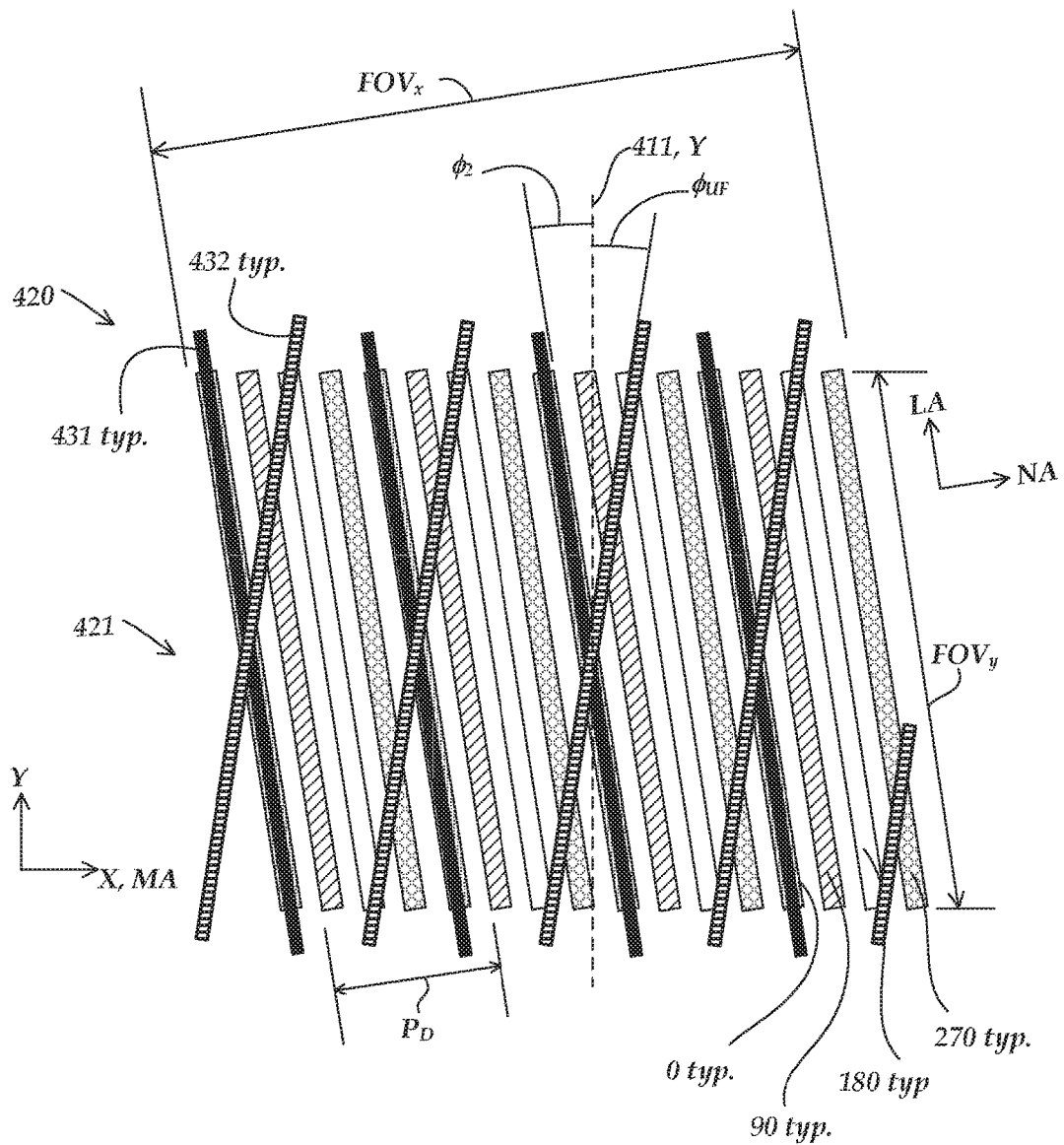
FIG. 4 is a schematic diagram of a detector portion which is rotated such that its sensing area long axes are aligned with interference fringes formed by desired interfering light components, which may be used in conjunction with an encoder configuration such as the encoder configuration of FIG. 3.

FIG. 4 is a schematic diagram of a detector portion 420 which is rotated such that its sensing area long axes are aligned with interference fringes formed by desired interfering light components, and which may be used in conjunction with an encoder configuration such as the encoder configuration 300. The angles and the pitches shown in FIG. 4 are exaggerated for clarity. As shown in FIG. 4 the detector portion 420 comprises periodically arranged optical detector sensing areas 421 that have a long axis LA and a narrow axis NA. Four different spatial phase groups are shown (each indicated by respective fill patterns and 0, 90, 180 and 270 spatial phase designations), for detecting a desired set of quadrature signals according to known principles. For reference, FIG. 4 shows a grating line reference direction 411 of the long axis of a scale grating (e.g., the scale grating 310) projected onto a detector plane DP of the detector portion 420 along an optical axis of an imaging portion of the encoder configuration (e.g., the imaging portion 320). FIG. 4 also shows exemplary fringes 431 which should be understood to represent the detected fringes (e.g., as shown in FIG. 2A) formed from the desired interfering light components (e.g., the interfering light components represented by the rays 232p1m1 and 232m1p1 in FIG. 2A) at the detector portion 420, and exemplary fringes 432 which should be understood to represent the undesired fringes formed from the undesired interfering light components (e.g., interfering light components represented by the ray 232m2p3 in FIG. 2B, and parallel light rays 232p2m3 that may arise from corresponding combinations of diffracted orders from the illumination grating and scale grating).

The detector portion 420 is oriented or rotated such that the optical detector sensing area long axes LA are aligned with desired interference fringes (e.g., the exemplary fringe 431) formed by the desired interfering light components. As a result, the optical detector sensing area long axes LA are rotated by a non-zero second yaw angle $\phi_2$ relative to grating lines of the scale grating when projected onto the detector plane DP along the optical axis (indicated by the reference line 411) and also significantly rotated with respect to the "undesired" interference fringes 432. The various interference fringes generally translate across the detector portion 420 along a direction perpendicular to the grating line reference direction 411. As a result, the detected desired interference fringes (e.g., the exemplary fringes 431), which are aligned with the individual detector areas, produce a strongly varying spatially periodic position signal contribution as a function of scale displacement, as desired. In contrast, the undesired interference fringes (e.g., the exemplary fringes 432), which are angled across the individual detector areas in approximately the manner illustrated, produce an approximately constant signal in each individual detector area regardless of their translated position, which produces little or no error in the desired spatially periodic variations in the position signal.

To summarize previously outlined principles, in some implementations, an aperture of an encoder configuration using the detector portion 420 may be configured to block a respective set of undesired interference fringes formed by +2 order and −2 order light components and a respective set of undesired interference fringes formed by +3 order and −3 order light components from reaching the detector portion 420 (e.g., as illustrated in FIG. 2A). Furthermore, as shown in FIG. 4, the optical detector sensing area long axes LA are intentionally misaligned with a respective set of undesired interference fringes formed by the unblocked sequential +2 order and −3 order light components (from the illumination grating and scale grating, respectively) mixing with the +1 and −1 order DLC, and the unblocked sequential −2 order and +3 order light components mixing with the −1 and +1 order DLC, in order to mitigate their undesired effect on the signals in the detector portion 420.

In some embodiments, it may be advantageous to configure a detector portion to satisfy certain design relationships when it is oriented and/or rotated according to principles disclosed and claimed herein. For example, as shown in FIG. 4, the optical detector sensing areas 421 may be characterized as having a field of view dimension FOVy along their long axes. Using small angle approximations, if FOVy≅$P_D/(\phi_{2+}\phi_{UDF})$≅$P_D/(2*\phi_2)$, then the signal contributions from the undesired fringes 432 will be nominally constant as they translate across the detector portion 420. For a previously used exemplary embodiment wherein PD=6 microns and $\phi_2$=0.0051 radians, this would imply that a field of view dimension FOVy of approximately 588 microns would be desirable, which is nearly 100 times the fringe pitch $P_{DF}$ of the interference fringes formed by the desired interfering light components. However, such an embodiment is exemplary only, and not limiting. The aforementioned FOVy dimension is the ideal dimension. However, in various embodiments, the ideal FOVy dimension need not be provided or achieved in order to derive benefit from the principles disclosed herein. In other embodiments it is considered desirable if the FOVy dimension is within +/−20% of its ideal value. In some implementations, it may be considered advantageous and sufficient if the optical detector sensing area long axes simply have a dimension that is at least 25 times a fringe pitch $P_{DF}$ of the interference fringes formed by the desired interfering light components, or 25 times the pitch $P_D$ of the detector portion. In various embodiments, it may be advantageous to make the field of view dimension FOVx along the narrow axis direction as large as possible.

In the implementation shown in FIG. 4, each of the optical detector sensing areas 421 of the detector portion 420 is defined by an area of a corresponding photodetector element. In alternative implementations, a similarly oriented detector may comprise at least one photodetector that receives light that is spatially filtered through a periodic array of openings in a corresponding mask element, and each sensitive area is defined by the area of a mask opening.

In the implementation shown in FIG. 4, four arrays of periodically arranged optical detector sensing areas are interleaved with one another on the detector portion 420 in order to provide quadrature sensing of the interference fringes formed by the desired interfering light components at phases of 0, 90, 180 and 270 degrees of the fringe pitch $P_{DF}$. More generally, a different number of similar arrays could be used. Generally, at least two arrays of periodically arranged optical detector sensing areas having a detector pitch $P_D$ that matches a fringe pitch $P_{IF}$ of the interference fringes formed by the desired interfering light components, and are arranged at a first and second desired spatial phase position. In some implementations, three or four such arrays arranged at desired spatial phase positions that are evenly spaced over 360 degrees of relative spatial phase shift are even more desirable, as is generally known in the art.

Figure 5:
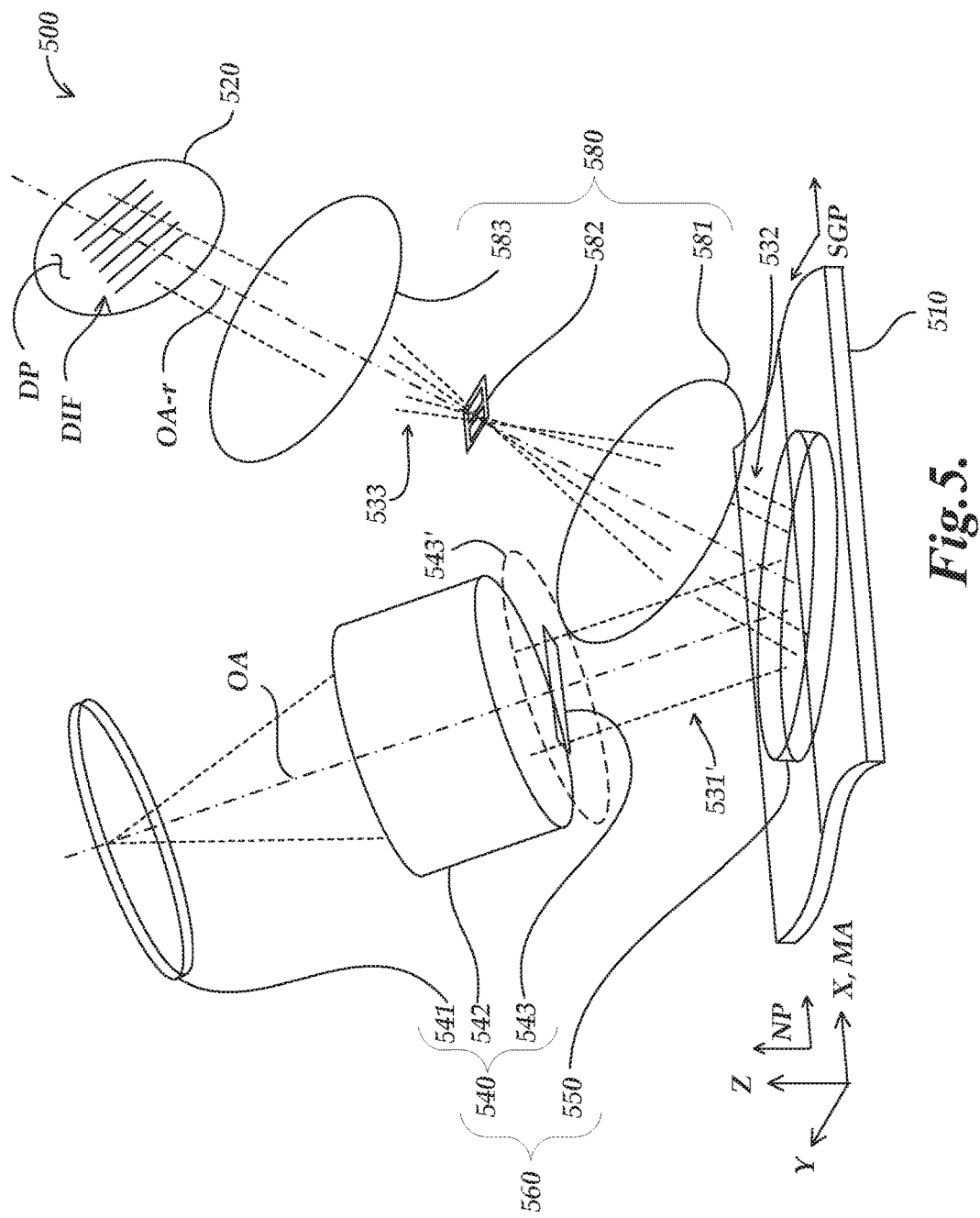
FIG. 5 is a partially schematic diagram of a reflective encoder configuration which is otherwise analogous to the encoder configuration shown in FIG. 3, wherein the configuration rotates various components in accordance with the principles disclosed herein, to eliminate potential signal contributions from various undesired interfering light components.

FIG. 5 is a partially schematic diagram of a reflective encoder configuration 500 which is otherwise analogous to the encoder configuration shown in FIG. 3, wherein the configuration rotates various components (e.g., an illumination grating 550 and a detector portion 520) in accordance with the principles disclosed herein, to eliminate potential signal contributions from various undesired interfering light components. In particular, the encoder configuration 500 is operationally analogous to the encoder configuration 300 of FIG. 3, and may generally be understood by analogy. For example, 5XX series numbers in FIG. 5 that have the same "XX" suffix as 3XX series numbers in FIG. 3 may designate similar or identical elements, which may function similarly, except as otherwise described or implied below. The encoder configuration 500 comprises a scale grating 510, an illumination source 560, a detector portion 520, and a doubly telecentric imaging portion 580. In the implementation shown in FIG. 5, the scale grating 510 is a reflective grating. The illumination source 560 comprises an illumination source 540 and an illumination source light diffraction grating 550. The illumination source 540 further comprises a light source 541, a collimating lens 542 and a limiting aperture 543 comprising an opening in an aperture element 543'. The limiting aperture 543 is configured to limit collimated light 531' output by the illumination source 560. The collimated light 531' is input to the illumination source light diffraction grating 550 along an input direction that is angled on a first side of a normal plane NP that is normal to a scale grating plane SGP and parallel to a measuring axis direction MA. The illumination source light diffraction grating 550 outputs desired interfering light components, comprising +1 and −1 order light from the illumination source light diffraction grating 550, which are reflected from the scale grating 510 along the general direction of the reflected optical axis OA-r and propagate through the aperture 582 and interfere to create desired interference fringes DIF having a detected fringe pitch $P_{DF}$ on the detector portion 520, which is arranged according to the known Scheimpflug principle, such that the scale grating plane SGP is imaged on a detection plane of the detector portion 520. Some undesired interfering light components arising from the illumination grating 550 and the scale grating 510 are blocked from reaching the detector portion 520 by the aperture 582, as previously outlined with reference to FIG. 2A. The grating elements of the illumination grating 550 and the individual detector areas of the detector portion 520 are rotated in a manner analogous to that previously outlined with reference to FIG. 3 and FIG. 4, such that undesired interference fringes formed by the unblocked sequential +2 order and −3 order light components (from the illumination grating and scale grating, respectively) mixing with the +1 order and −1 order DLC, and unblocked sequential −2 order and +3 order light components mixing with the −1 order and +1 order DLC, are mitigated in their undesired effect on the signals in the detector portion 520.

It should be appreciated that the rotations of the grating elements of the illumination grating 550 and the individual detector areas of the detector portion 520 described herein may be very small in various embodiments (e.g., less than one degree, in some cases). The descriptions of the planes of projection and "measurement" of such angles as previously described herein are primarily for the purposes of convenient description, and are not limiting in terms of the physical planes of rotation of the associated components. Thus, the rotations can be made about various convenient axes, in various embodiments, and fall within the scope of this disclosure. In the implementation shown in FIG. 5, the illumination source light diffraction grating 550 is arranged parallel to the scale grating plane SGP and the rotation may be achieved in the plane of the illumination grating 550, or about the optical axis OA or other plane, if desired. The detector 520 is located along the optical axis OA-r in a detector plane DP that is arranged at a Scheimpflug plane relative to the scale grating plane SGP. The detector sensing area long axis rotation may be achieved in the plane DP of the detector portion 420, or about the optical axis OA-r or other plane, if desired.

While various implementations have been illustrated and described, numerous variations in the illustrated and described arrangements of features and sequences of operations will be apparent to one skilled in the art based on this disclosure. For example, as previously outlined herein, the desired component rotations are characterized with reference to the lines of the scale grating lines (e.g., by projection of the rotation of the illumination grating lines or the detector area long axes to the plane of the scale grating lines, or vice versa.) Based on this disclosure, one skilled in the art may recognize that it is possible to utilize the principles disclosed herein by rotating the scale grating lines in place of or in addition to one or more of the other component rotations outlined herein. Thus, the rotations outlined herein may be understood as relative rotations, and a desired relative rotation or angle need not necessarily be achieved by the physical rotation or alignment of a single individual component in some embodiments. Thus, it will be appreciated that various changes can be made to various embodiments in accordance with the more general principles disclosed herein, without departing from the spirit and scope of the invention.

The embodiments of the invention in which an exclusive property or privilege claimed are defined as follows:

1. A device for measuring relative displacement between two members, the device comprising:
   a scale grating extending along a measuring axis direction, the scale grating defining a scale grating plane and having a scale grating pitch $P_{SG}$;
   an illumination source comprising a The embodiments of the invention in which an exclusive property or privilege claimed are defined as follows:light source that outputs collimated light having a wavelength $\lambda$, and an illumination source light diffraction grating having an illumination grating pitch $P_{IG}$ that inputs the collimated light and outputs diffracted light components (DLC) to the scale grating, the DLC comprising:
   a) desired interfering light components comprising +1 and −1 order DLC; and
   b) undesired interfering light components comprising diffraction orders that are not the +1 and −1 order DLC;
   a detector portion comprising at least a first array of periodically arranged optical detector sensing areas that have a long axis and a narrow axis, and define a detector plane;
   an imaging portion configured to image an illuminated portion of the scale grating plane onto the detector portion, comprising:
   a first lens positioned to receive desired and undesired interfering light components from the scale grating, the first lens having an optical axis and a focal length F that defines a focal point located along the optical axis between the first lens and the detector portion; and
   an aperture element positioned along the optical axis approximately at the focal length F between the first lens and the detector portion,
   wherein:
   the illumination source light diffraction grating is positioned proximate to the scale grating and oriented relative to the scale grating such that grating lines of the illumination source light diffraction grating are rotated by a non-zero first yaw angle $\phi_1$ relative to grating lines of the scale grating, when projected onto the scale grating plane along a direction normal the scale grating plane, whereby respective sets of interference fringes formed by different respective sets of interfering light components are differently rotated about the optical axis; and
   the detector portion is oriented such that the optical detector sensing area long axes are aligned with interference fringes formed by the desired interfering light components, whereby the optical detector sensing area long axes are rotated by a non-zero second yaw angle $\phi_2$ relative to grating lines of the scale grating when projected onto the scale grating plane along the optical axis.

2. The device of claim 1, wherein the illumination source, the detector portion and the imaging portion are arranged in a fixed relationship to one another in a readhead.

3. The device of claim 1, wherein the illumination source light diffraction grating is arranged parallel to the scale grating plane.

4. The device of claim 1, wherein the scale grating is a reflective grating, the collimated light is input to the illumination source light diffraction grating along an input direction that is angled on a first side of a normal plane that is normal to the scale grating plane and parallel to the measuring axis direction, and the optical axis is angled on an opposite side of the normal plane.

5. The device of claim 4, wherein the illumination source light diffraction grating is arranged parallel to the scale grating plane.

6. The device of claim 4, wherein the detector portion is located along the optical axis in the detector plane that is arranged at a Scheimpflug plane relative to the scale grating plane.

7. The device of claim 1, wherein the device is configured such that at least one respective set of interference fringes formed by undesired interfering light components is formed by a respective set of undesired interfering light components that reach the detector portion, and the optical detector sensing area long axes are not aligned with that at least one respective set of undesired interference fringes.

8. The device of claim 7, wherein:
   the aperture element is configured to block a respective set of undesired interference fringes formed by +2 order and −2 order light components and a respective set of undesired interference fringes formed by +3 order and −3 order light components from reaching the detector portion; and
   the optical detector sensing area long axes are not aligned with a respective set of undesired interference fringes formed by +2 order and −3 order light components mixing with +1 order and −1 order DLC and a respective set of undesired interference fringes formed by −2 order and +3 order light mixing with −1 and +1 order DLC.

9. The device of claim 7, wherein:
   the detector portion is positioned a distance Z from the imaging portion along the optical axis;
   the first array of periodically arranged optical detector sensing areas has a detector pitch $P_D$ that matches a fringe pitch $P_{DF}$ of the interference fringes formed by the desired interfering light components, and is arranged at a first spatial phase position; and
   the aperture is configured with a dimension AW along the measuring axis direction such that AW=Z*$\lambda$*(2*a/

$(P_{IG}P_{SG}/((P_{IG}-P_{SG})*M))$, where M is a magnification value of the imaging portion, and a value of a is greater than 0.5 and less than 4.0.

10. The device of claim 1, wherein each optical detector sensing area is defined by an area of a corresponding photodetector element.

11. The device of claim 1, wherein the detector portion comprises at least one photodetector that receives light that is spatially filtered through a periodic array of openings in a corresponding mask element, and each optical detector sensing area is defined by an area of a mask opening.

12. The device of claim 1, wherein the first array of periodically arranged optical detector sensing areas has a detector pitch $P_D$ that matches a fringe pitch $P_{DF}$ of the interference fringes formed by the desired interfering light components, and is arranged at a first spatial phase position.

13. The device of claim 12, wherein the detector portion comprises a second array of periodically arranged optical detector sensing areas that has a detector pitch $P_D$ that matches the fringe pitch $P_{DF}$ of the interference fringes formed by the desired interfering light components, and is arranged at a second spatial phase position.

14. The device of claim 13, wherein the first and second arrays of periodically arranged optical detector sensing areas are interleaved with one another on the detector portion.

15. The device of claim 1, wherein the optical detector sensing area long axes have a dimension that is at least 25 times a fringe pitch $P_{DF}$ of the interference fringes formed by the desired interfering light components.

16. The device of claim 1, wherein the scale grating pitch is at most 6 μm.

17. The device of claim 1, wherein the imaging portion further comprises a second lens having a focal length Fs, wherein the second lens is positioned between the aperture element and the detector portion at the focal length Fs from the aperture element, and is configured to receive spatially filtered light from the aperture element and output a spatially filtered image of the illuminated portion of the scale grating plane onto the detector portion.

18. The device of claim 1, wherein the illumination source light diffraction grating comprises a phase grating configured to block or suppress 0 order DLC.

19. The device of claim 1, wherein the second yaw angle $\phi_2$ is approximately equal to $(P_{SG}/2*P_{DF})$ times the first yaw angle $\phi_1$, where $P_{DF}$ is the nominal fringe pitch of the interference fringes formed by the desired interfering light components.

20. The device of claim 19, wherein:
the first array of periodically arranged optical detector sensing areas has a detector pitch $P_D$ that matches a fringe pitch $P_{DF}$ of the interference fringes formed by the desired interfering light components; and
the optical detector sensing areas have a field of view dimension $FOV_y$ along their long axes that is in the range $P_D/(2\phi_2)_2)+/-20\%$, where $\phi_2$ is expressed in radians.

* * * * *

UNITED STATES PATENT AND TRADEMARK OFFICE
CERTIFICATE OF CORRECTION

PATENT NO.         : 10,077,991 B2                                Page 1 of 1
APPLICATION NO.    : 15/277413
DATED              : September 18, 2018
INVENTOR(S)        : Norman Laman It is certified that error appears in the above-identified patent and that said Letters Patent is hereby corrected as shown below:

In the Claims

Column 15, Lines 35-37, Claim 1:
"an illumination source comprising a The embodiments of the invention in which an exclusive property or privilege claimed are defined as follows:light source that"
Should read:
--an illumination source comprising a light source that--.

Column 18, Line 27, Claim 20:
"range PD/(2$\phi_2$) +/- 20%, where $\phi_2$ is expressed in"
Should read:
--range PD/(2*$\phi_2$) +/- 20%, where $\phi_2$ is expressed in"--.

Signed and Sealed this
Twenty-sixth Day of February, 2019

Andrei Iancu
*Director of the United States Patent and Trademark Office*